(12) United States Patent
Gao

(10) Patent No.: US 11,297,616 B2
(45) Date of Patent: Apr. 5, 2022

(54) MULTI-SLOT TRANSMISSION METHOD AND DEVICE

(71) Applicant: CHINA ACADEMY OF TELECOMMUNICATIONS TECHNOLOGY, Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 139 days.

(21) Appl. No.: 16/764,827

(22) PCT Filed: Oct. 24, 2018

(86) PCT No.: PCT/CN2018/111629
§ 371 (c)(1),
(2) Date: May 15, 2020

(87) PCT Pub. No.: WO2019/095946
PCT Pub. Date: May 23, 2019

(65) Prior Publication Data
US 2020/0344753 A1    Oct. 29, 2020

(30) Foreign Application Priority Data

Nov. 17, 2017   (CN) .......................... 201711147205.2

(51) Int. Cl.
*H04W 72/04*       (2009.01)
(52) U.S. Cl.
CPC ..... *H04W 72/0446* (2013.01); *H04W 72/042* (2013.01); *H04W 72/0493* (2013.01)

(58) Field of Classification Search
CPC .......... H04W 72/0446; H04W 72/042; H04W 72/0493
See application file for complete search history.

(56) References Cited

U.S. PATENT DOCUMENTS

| 2012/0263124 A1 | 10/2012 | Gaal et al. |
| 2015/0223213 A1 | 8/2015 | Moon et al. |
| 2017/0188357 A1 | 6/2017 | Visotsky et al. |

(Continued)

FOREIGN PATENT DOCUMENTS

| CN | 1150876 A | 5/1997 |
| CN | 103181113 A | 6/2013 |
| CN | 103391554 A | 11/2013 |

(Continued)

OTHER PUBLICATIONS

"Discussion on resource allocation and TBS determination", R1-1715885, 3GPP TSG RAN WG1 Meeting NR#3, Nagoya, Japan, Sep. 18-21, 2017.

(Continued)

*Primary Examiner* — Melvin C Marcelo
(74) *Attorney, Agent, or Firm* — Ladas & Parry, LLP

(57) ABSTRACT

A multi-slot transmission method and a multi-slot transmission device are provided. The multi-slot transmission method includes: determining a value of the quantity of slots in a set of the quantities of slots; and transmitting the value of the quantity of slots to a UE, the value of the quantity of slots being used by the UE to perform a PUCCH transmission and/or a PUSCH transmission within multiple slots.

20 Claims, 7 Drawing Sheets

201 determining a value of the quantity of slots in a set of the quantities of slots

202 transmitting the value of the quantity of slots to a UE, the value of the quantity of slots being used by the UE to perform a PUCCH transmission and/or a PUSCH transmission within multiple slots

(56) References Cited

U.S. PATENT DOCUMENTS

2021/0022143 A1* 1/2021 Xiong ................... H04L 5/0044

FOREIGN PATENT DOCUMENTS

| CN | 106385709 A | 2/2017 | |
|---|---|---|---|
| CN | 107046718 A | 8/2017 | |
| EP | 3661103 A1 | 3/2020 | |
| WO | 2017167242 A1 | 10/2017 | |
| WO | 2017194023 A1 | 11/2017 | |
| WO | WO-2018203823 A1 * | 11/2018 | ........ H04W 72/0446 |

OTHER PUBLICATIONS

"Long PUCCH over multiple slots", R1-1717387, 3GPP TSG RAN WG1 Meeting 90bis, Prague, CZ, Oct. 9-13, 2017.

"Support of long PUCCH over multiple slots for NR", R1-1717961, 3GPP TSG RAN WG1 Meeting 90bis, Prague, CZ, Oct. 9-13, 2017.

"Time unit for scheduling and HARQ in NR", R2-1711194, 3GPP TSG RAN WG2 NR Meeting #99bis, Prague, CZ, Oct. 9-13, 2017.

First Office Action and Search Report from CN app. No. 201711147205.2, dated Apr. 17, 2020, with English translation provided by Global Dossier.

First Office Action from TW app. No. 107139133, dated Apr. 30, 2020, with machine English translation.

International Search Report from PCT/CN2018/111629, dated Jan. 18, 2019, with English translation from WIPO.

Written Opinion of the International Searching Authority from PCT/CN2018/111629, dated Jan. 18, 2019, with English translation from WIPO.

International Preliminary Report on Patentability from PCT/CN2018/111629, dated May 19, 2020, with English translation from WIPO.

Notice of Reason for Refusal from JP app. No. 2020-526862, dated Apr. 27, 2021, with English translation from Global Dossier.

"5G NR long PUCCH considerations", R1-1700731, 3GPP TSG RAN WG1 NR Ad Hoc Meeting, Spokane, USA, Jan. 16-20, 2017.

"Resource allocation for PUCCH", R1-1715689, 3GPP TSG RAN WG1 Meeting NR#3, Nagoya, Japan, Sep. 18-21, 2017.

"Resource indication of UL control channel", R1-1701648, 3GPP TSG RAN WG1 Meeting #88, Athens Greece, Feb. 13-17, 2017.

"Long PUCCH for UCI of 1 or 2 Bits", R1-1713627, 3GPP TSG RAN WG1 #90, Prague, Czech Republic, Aug. 21-25, 2017.

Extended European Search Report from EP app. No. 18878735.2, dated Nov. 17, 2020.

* cited by examiner

MULTI-SLOT TRANSMISSION METHOD AND DEVICE

CROSS-REFERENCE TO RELATED APPLICATION

The present application is the U.S. national phase of PCT Application No. PCT/CN2018/111629 filed on Oct. 24, 2018, which claims a priority of the Chinese patent application No. 201711147205.2 filed in China on Nov. 17, 2017, the disclosures of which are incorporated herein by reference in their entireties.

TECHNICAL FIELD

The present disclosure relates to the field of communication technology, in particular to a multi-slot transmission method and a multi-slot transmission device.

BACKGROUND

Along with the change in the requirements on mobile communication services, such organizations as International Telecommunication Union (ITU) and $3^{rd}$-Generation Partnership Project (3GPP) have studied a new radio communication system (e.g., $5^{th}$-Generation New Radio Access Technology (RAT) (NR) system). A new frame structure is defined in the new radio communication system, so as to support different numerologies (including parameters such as subcarrier spacings). With respect to different numerologies, a length of one subframe is defined as 1 ms, and one subframe includes A slots. Values of A may be different for different numerologies, so as to ensure that the length of the subframe is 1 ms. With respect to different numerologies, one slot may include 7 or 14 symbols (e.g., Orthogonal Frequency Division Multiplexing (OFDM) or Discrete Fourier Transformation Spreading OFDM (DFT-S-OFDM) symbols). One slot may be provided with various slot structures/formats corresponding to different uplink/downlink resource division modes. For example, all symbols within one slot may be used for Downlink (DL) transmission, i.e., the slot may be a DL only slot; or all the symbols within one slot may be used for Uplink (UL) transmission, i.e., the slot may be a UL only slot; or some of the symbols within one slot may be used for the UL transmission and some of the symbols within one slot may be used for the DL transmission, i.e., the slot may be a DL+UL slot. The slot structures/formats may be notified to a User Equipment (UE) in a semi-static manner through Radio Resource Control (RRC) signaling, or notified to the UE in a dynamic manner through group common Physical Downlink Control Channel (PDCCH) to dynamically change the slot structure.

The quantity of uplink symbols within one slot may probably change, so two types of NR-Physical Uplink Control Channels (PUCCHs), i.e., a long NR-Physical Uplink Control Channel (PUCCH) and a short NR-PUCCH, have bene defined in the 5G NR system. For the transmission of the long NR-PUCCH within one slot, 4 to 14 symbols may be occupied. The NR system may support different numerologies corresponding to at least different subcarrier spacings and different symbol lengths.

However, in the 5G NR system, there is an urgent need to find a way for determining the quantity of slots during the transmission of the PUCCH within the slots.

SUMMARY

In view of the above, an object of the present disclosure is to provide a multi-slot transmission method and a multi-slot transmission device, so as to determine the quantity of slots during the transmission of the PUCCH within the slots.

In one aspect, the present disclosure provides in some embodiments a multi-slot transmission method for a network-side device, including: determining a value of the quantity of slots in a set of the quantities of slots; and configuring the value of the quantity of slots to a UE, the value of the quantity of slots being used by the UE to perform a PUCCH transmission and/or a PUSCH transmission within multiple slots.

In a possible embodiment of the present disclosure, the set of the quantities of slots is a predefined first set of the quantities of slots. The determining the value of the quantity of slots in the set of the quantities of slots includes selecting the value of the quantity of slots from the first set of the quantities of slots.

In a possible embodiment of the present disclosure, the set of the quantities of slots is a predefined second set of the quantities of slots. The determining the value of the quantity of slots in the set of the quantities of slots includes: determining a plurality of values of the quantities of slots configured for the UE in the second set of the quantities of slots; and selecting the value of the quantity of slots from the plurality of values of the quantities of slots.

In a possible embodiment of the present disclosure, the multi-slot transmission method further includes configuring the plurality of values of the quantities of slots for the UE through high-layer signaling.

In a possible embodiment of the present disclosure, the set of the quantities of slots is a predefined third set of the quantities of slots with respect to each numerology. The determining the value of the quantity of slots in the set of the quantities of slots includes: determining a corresponding third set of the quantities of slots in accordance with a numerology; and selecting the value of the quantity of slots from the corresponding third set of the quantities of slots.

In a possible embodiment of the present disclosure, the set of the quantities of slots is a predefined fourth set of the quantities of slots with respect to each numerology. The determining the value of the quantity of slots in the set of the quantities of slots includes: determining a corresponding fourth set of the quantities of slots in accordance with a numerology; determining a plurality of values of the quantities of slots configured for the UE in the fourth set of the quantities of slots; and selecting the value of the quantity of slots from the plurality of values of the quantities of slots.

In a possible embodiment of the present disclosure, the multi-slot transmission method further includes configuring the plurality of values of the quantities of slots for the UE through high-layer signaling.

In a possible embodiment of the present disclosure, the configuring the value of the quantity of slots to the UE includes configuring the value of the quantity of slots to the UE through high-layer signaling or Downlink Control Information (DCI).

In another aspect, the present disclosure provides in some embodiments a multi-slot transmission method for a UE, including: determining a value of the quantity of slots in a set of the quantities of slots; and performing a PUCCH transmission and/or a PUSCH transmission within multiple slots in accordance with the value of the quantity of slots.

In a possible embodiment of the present disclosure, the set of the quantities of slots is a predefined first set of the quantities of slots. The determining the value of the quantity of slots in the set of the quantities of slots includes selecting the value of the quantity of slots from the first set of the quantities of slots in accordance with configuration information transmitted from a network-side device.

In a possible embodiment of the present disclosure, the set of the quantities of slots is a predefined second set of the quantities of slots. The determining the value of the quantity of slots in the set of the quantities of slots includes: receiving a plurality of values of the quantities of slots configured by the network-side device for the UE, the plurality of values of the quantities of slots being values in the second set of the quantities of slots; and selecting the value of the quantity of slots from the plurality of values of the quantities of slots in accordance with the configuration information transmitted from the network-side device.

In a possible embodiment of the present disclosure, the multi-slot transmission method further includes receiving the plurality of values of the quantities of slots configured by the network-side device for the UE through high-layer signaling.

In a possible embodiment of the present disclosure, the set of the quantities of slots is a predefined third set of the quantities of slots with respect to each numerology. The determining the value of the quantity of slots in the set of the quantities of slots includes: determining a corresponding third set of the quantities of slots in accordance with a numerology; and selecting the value of the quantity of slots from the corresponding third set of the quantities of slots in accordance with the configuration information transmitted from the network-side device.

In a possible embodiment of the present disclosure, the set of the quantities of slots is a predefined fourth set of the quantities of slots with respect to each numerology. The determining the value of the quantity of slots in the set of the quantities of slots includes: determining a corresponding fourth set of the quantities of slots in accordance with a numerology; receiving a plurality of values of the quantities of slots configured by the network-side device for the UE, the plurality of values of the quantities of slots being values in the corresponding fourth set of the quantities of slots determined in accordance with the numerology; and selecting the value of the quantity of slots from the plurality of values of the quantities of slots in accordance with the configuration information transmitted from the network-side device.

In a possible embodiment of the present disclosure, the multi-slot transmission method further includes receiving the plurality of values of the quantities of slots configured by the network-side device for the UE through high-layer signaling.

In a possible embodiment of the present disclosure, the multi-slot transmission method further includes receiving, through high-layer signaling or DCI, the configuration information for determining the value of the quantity of slots transmitted from the network-side device.

In yet another aspect, the present disclosure provides in some embodiments a network-side device, including a first transceiver and a first processor. The first processor is configured to determine a value of the quantity of slots in a set of the quantities of slots. The first transceiver is configured to configure the value of the quantity of slots to a UE, and the value of the quantity of slots is used by the UE to perform a PUCCH transmission and/or a PUSCH transmission within multiple slots.

In a possible embodiment of the present disclosure, the set of the quantities of slots is a predefined first set of the quantities of slots. The first processor is further configured to select the value of the quantity of slots from the first set of the quantities of slots.

In a possible embodiment of the present disclosure, the set of the quantities of slots is a predefined second set of the quantities of slots. The first processor is further configured to: determine a plurality of values of the quantities of slots configured for the UE in the second set of the quantities of slots; and select the value of the quantity of slots from the plurality of values of the quantities of slots.

In a possible embodiment of the present disclosure, the first processor is further configured to configure the plurality of values of the quantities of slots for the UE through high-layer signaling.

In a possible embodiment of the present disclosure, the set of the quantities of slots is a predefined third set of the quantities of slots with respect to each numerology. The first processor is further configured to: determine a corresponding third set of the quantities of slots in accordance with a numerology; and select the value of the quantity of slots from the corresponding third set of the quantities of slots.

In a possible embodiment of the present disclosure, the set of the quantities of slots is a predefined fourth set of the quantities of slots with respect to each numerology. The first processor is further configured to: determine a corresponding fourth set of the quantities of slots in accordance with a numerology; determine a plurality of values of the quantities of slots configured for the UE in the fourth set of the quantities of slots; and select the value of the quantity of slots from the plurality of values of the quantities of slots.

In a possible embodiment of the present disclosure, the first processor is further configured to configure the plurality of values of the quantities of slots for the UE through high-layer signaling.

In a possible embodiment of the present disclosure, the first transceiver is further configured to configure the value of the quantity of slots to the UE through high-layer signaling or DCI.

In still yet another aspect, the present disclosure provides in some embodiments a UE, including a second processor and a second transceiver. The second processor is configured to determine a value of the quantity of slots in a set of the quantities of slots. The second transceiver is configured to perform a PUCCH transmission and/or a PUSCH transmission within multiple slots in accordance with the value of the quantity of slots.

In a possible embodiment of the present disclosure, the set of the quantities of slots is a predefined first set of the quantities of slots. The second processor is further configured to select the value of the quantity of slots from the first set of the quantities of slots in accordance with configuration information transmitted from a network-side device.

In a possible embodiment of the present disclosure, the set of the quantities of slots is a predefined second set of the quantities of slots. The second transceiver is further configured to receive a plurality of values of the quantities of slots configured by the network-side device for the UE, and the plurality of values of the quantities of slots are values in the second set of the quantities of slots. The second processor is further configured to select the value of the quantity of slots from the plurality of values of the quantities of slots in accordance with the configuration information transmitted from the network-side device.

In a possible embodiment of the present disclosure, the second processor is further configured to receive the plurality of values of the quantities of slots configured by the network-side device for the UE through high-layer signaling.

In a possible embodiment of the present disclosure, the set of the quantities of slots is a predefined third set of the quantities of slots with respect to each numerology. The second processor is further configured to: determine a corresponding third set of the quantities of slots in accordance with a numerology; and select the value of the quantity of slots from the corresponding third set of the quantities of slots in accordance with the configuration information transmitted from the network-side device.

In a possible embodiment of the present disclosure, the set of the quantities of slots is a predefined fourth set of the quantities of slots with respect to each numerology. The second processor is further configured to determine a corresponding fourth set of the quantities of slots in accordance with a numerology. The second transceiver is further configured to receive a plurality of values of the quantities of slots configured by the network-side device for the UE, and the plurality of values of the quantities of slots are values in the corresponding fourth set of the quantities of slots determined in accordance with the numerology. The second processor is further configured to select the value of the quantity of slots from the plurality of values of the quantities of slots in accordance with the configuration information transmitted from the network-side device.

In a possible embodiment of the present disclosure, the second transceiver is further configured to receive the plurality of values of the quantities of slots configured by the network-side device for the UE through high-layer signaling.

In a possible embodiment of the present disclosure, the second processor is further configured to receive, through high-layer signaling or DCI, the configuration information for determining the value of the quantity of slots transmitted from the network-side device.

In still yet another aspect, the present disclosure provides in some embodiments a network-side device, including a memory, a processor, a transceiver, and a computer program stored in the memory and executed by the processor. The processor is configured to execute the computer program so as to implement the above-mentioned multi-slot transmission method for the network-side device.

In still yet another aspect, the present disclosure provides in some embodiments a UE, including a memory, a processor, a transceiver, and a computer program stored in the memory and executed by the processor. The processor is configured to execute the computer program so as to implement the above-mentioned multi-slot transmission method for the UE.

In still yet another aspect, the present disclosure provides in some embodiments a computer-readable storage medium storing therein a computer program. The computer program is executed by a processor so as to implement the above-mentioned multi-slot transmission method for the network-side device, or the above-mentioned multi-slot transmission method for the UE.

According to the embodiments of the present disclosure, the UE may determine the value of the quantity of slots from the preconfigured set of the quantities of slots in accordance with the configuration information from the network-side device. As a result, it is able to perform the PUCCH transmission and/or the PUSCH transmission within multiple slots, thereby to improve the performance as well as the uplink coverage of the PUCCH transmission and/or the PUSCH transmission.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

The expression "and/or" may be merely used to describe the relationship between objects, and it may include three relationships. For example, "A and/or B" may represent that, there is only A, there are both A and B, or there is only B.

Such words as "first" and "second" in the specification and the appended claims may be merely used to differentiate objects, rather than to describe a specific order of the objects. For example, the words "first" and "second" before "processor" are used to differentiate the processors, rather than to describe a specific order of the processors.

Such expressions as "illustrative" and "for example" may be merely used to show examples, instances, or explanations. Any illustrative or exemplified embodiment or scheme in the present disclosure shall not be construed as being superior over or more preferable than the other embodiment or scheme. Definitely, such words as "illustrative" and "for example" intend to exhibit relevant concepts in a concrete manner.

Figure 1:
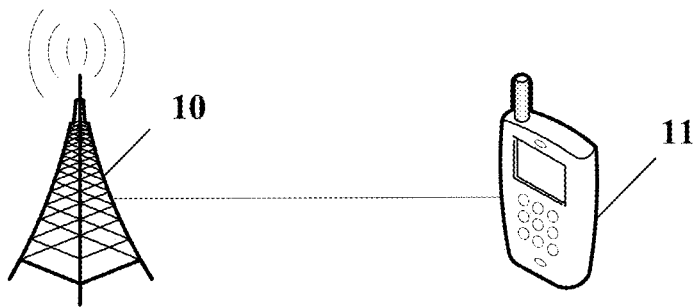
FIG. 1 is a schematic view showing architecture of a radio communication system according to an embodiment of the present disclosure.

The present disclosure will be described hereinafter in conjunction with the drawings and embodiments. the method and the device for transmitting the downlink control channel and the method and device for receiving the downlink control channel in the embodiments of the present disclosure may be applied to a radio communication system, e.g., a $5^{th}$ Generation (5G) mobile communication system (short for 5G system). As shown in FIG. 1, the radio communication system may include a network-side device 10 and a UE 11 capable of communicating with the network-side device 10. In actual use, the device and the equipment may be connected to each other in a wireless manner. To conveniently show a connection relationship therebetween, a solid line is adopted in FIG. 1.

It should be appreciated that, the communication system may include a plurality of UEs, and the network-side device may communicate with the plurality of UEs (e.g., transmit signaling or data).

The network-side device may be a base station, e.g., a commonly-used base station, an evolved Node B (eNB), a network-side device in the 5G system (e.g., a next generation Node B (gNB)), or a Transmission and Reception Point (TRP).

The UE may be a mobile phone, a flat-panel computer, a laptop computer, an Ultra-Mobile Personal Computer (UMPC), a netbook, or a Personal Digital Assistant (PDA).

Figure 2:
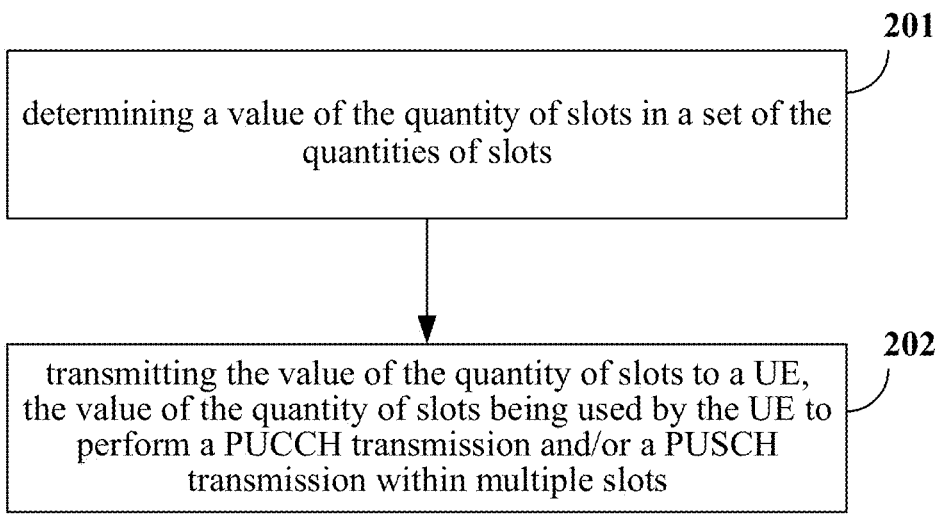
FIG. 2 is a flow chart of a multi-slot transmission method according to an embodiment of the present disclosure.

The present disclosure provides in some embodiments a multi-slot transmission method implanted by a network-side device which, as shown in FIG. 2, includes the following steps.

Step 201: determining a value of the quantity of slots in a set of the quantities of slots.

In a possible embodiment of the present disclosure, the set of the quantities of slots may be a predefined set of the quantities of slots without respect to the numerology, or with respect to each numerology.

It should be appreciated that, the quantity of the values of the quantities of slots in the set of the quantities of slots will not be particularly defined.

Step 202: configuring the value of the quantity of slots to a UE, the value of the quantity of slots being used by the UE to perform a PUCCH transmission and/or a PUSCH transmission within multiple slots.

In a possible embodiment of the present disclosure, the value of the quantity of slots may be configured to the UE through, but not limited to, high-layer signaling or DCI.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 3:
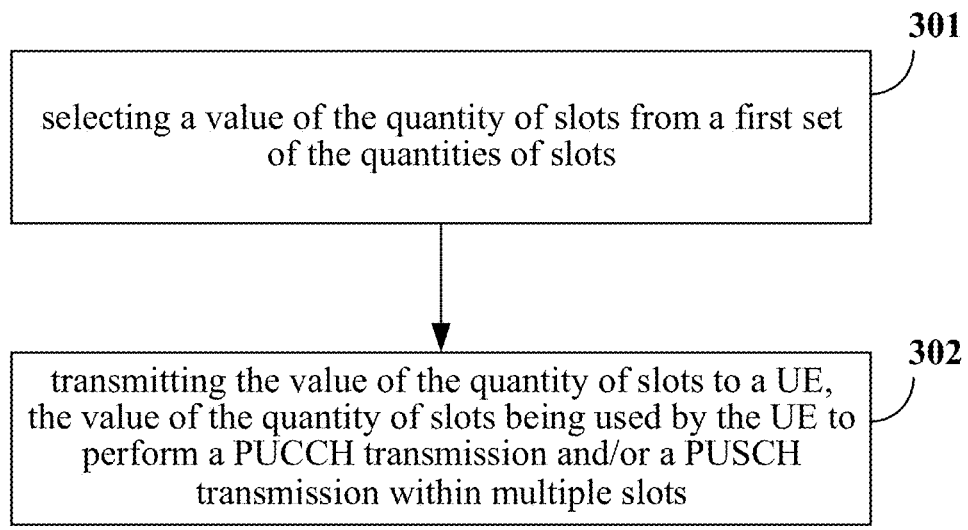
FIG. 3 is another flow chart of the multi-slot transmission method according to an embodiment of the present disclosure.

The present disclosure further provides in some embodiments a multi-slot transmission method implemented by a network-side device which, as shown in FIG. 3, includes the following steps.

Step 301: selecting a value of the quantity of slots from a first set of the quantities of slots.

In a possible embodiment of the present disclosure, the first set of the quantities of slots may be a predefined set of the quantities of slots without respect to the numerology.

Step 302: configuring the value of the quantity of slots to a UE, the value of the quantity of slots being used by the UE to perform a PUCCH transmission and/or a PUSCH transmission within multiple slots.

In a possible embodiment of the present disclosure, the value of the quantity of slots may be configured to the UE through, but not limited to, high-layer signaling or DCI.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 4:
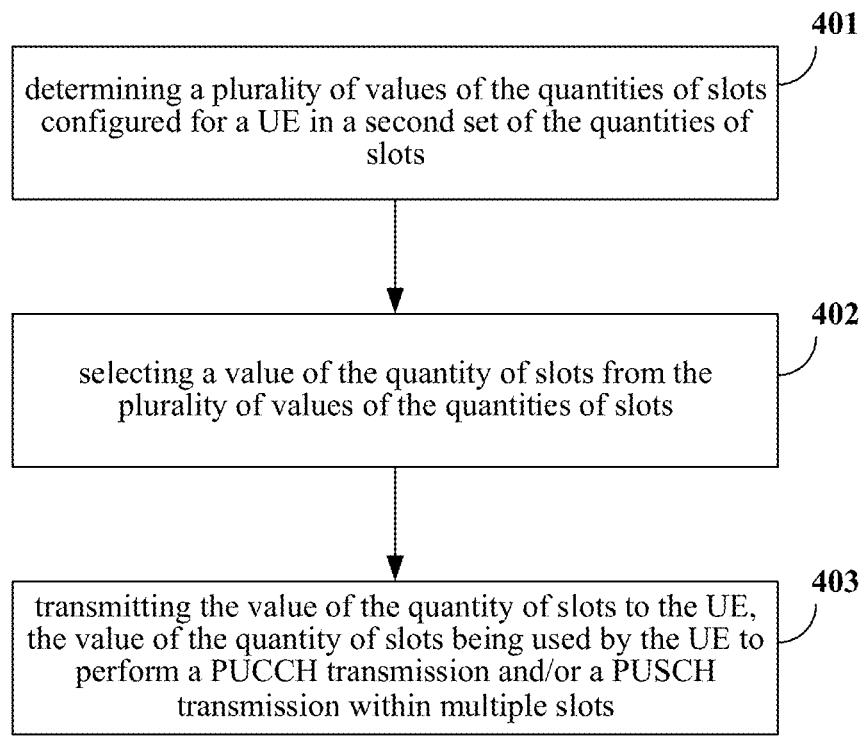
FIG. 4 is yet another flow chart of the multi-slot transmission method according to an embodiment of the present disclosure.

The present disclosure further provides in some embodiments a multi-slot transmission method implemented by a network-side device which, as shown in FIG. 4, includes the following steps.

Step 401: determining a plurality of values of the quantities of slots configured for a UE in a second set of the quantities of slots.

In a possible embodiment of the present disclosure, the second set of the quantities of slots may be a predefined set of the quantities of slots without respect to the numerology.

Step 402: selecting a value of the quantity of slots from the plurality of values of the quantities of slots.

Step 403: configuring the value of the quantity of slots to the UE, the value of the quantity of slots being used by the UE to perform a PUCCH transmission and/or a PUSCH transmission within multiple slots.

In a possible embodiment of the present disclosure, the value of the quantity of slots may be configured to the UE through, but not limited to, high-layer signaling or DCI.

In a possible embodiment of the present disclosure, the plurality of values of the quantities of slots may be configured for the UE through high-layer signaling.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 5:
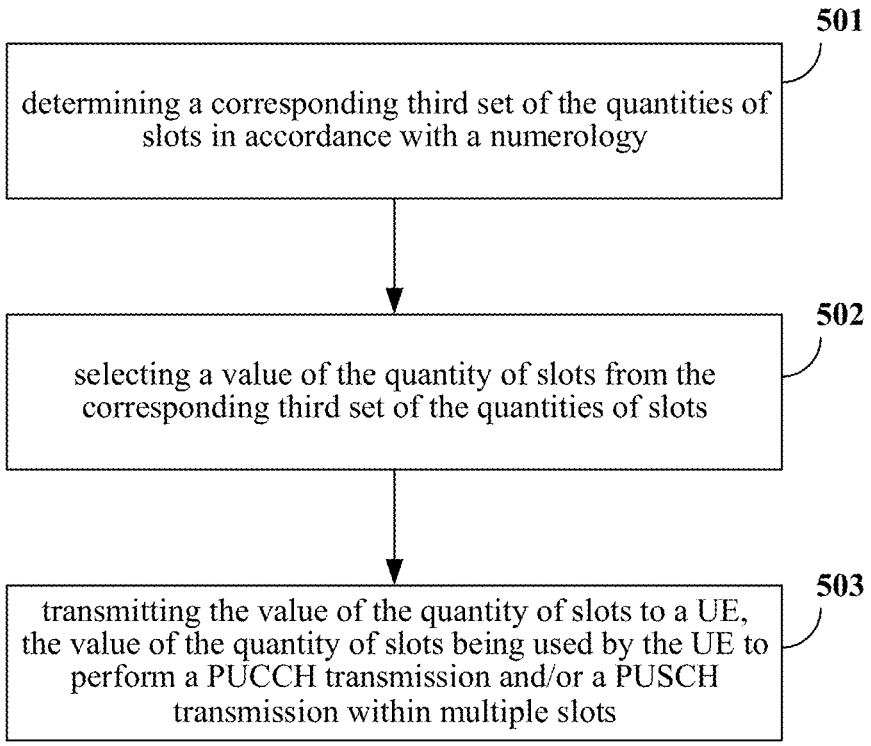
FIG. 5 is still yet another flow chart of the multi-slot transmission method according to an embodiment of the present disclosure.

The present disclosure further provides in some embodiments a multi-slot transmission method implemented by a network-side device which, as shown in FIG. 5, includes the following steps.

Step 501: determining a corresponding third set of the quantities of slots in accordance with a numerology.

In a possible embodiment of the present disclosure, the third set of the quantities of slots may be a predefined set of the quantities of slots with respect to each numerology.

Step 502: selecting a value of the quantity of slots from the corresponding third set of the quantities of slots.

Step 503: configuring the value of the quantity of slots to a UE, the value of the quantity of slots being used by the UE to perform a PUCCH transmission and/or a PUSCH transmission within multiple slots.

In a possible embodiment of the present disclosure, the value of the quantity of slots may be configured to the UE through, but not limited to, high-layer signaling or DCI.

According to the embodiments of the present disclosure, the UE may determine the value of the quantity of slots from the preconfigured set of the quantities of slots in accordance with the configuration from the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 6:
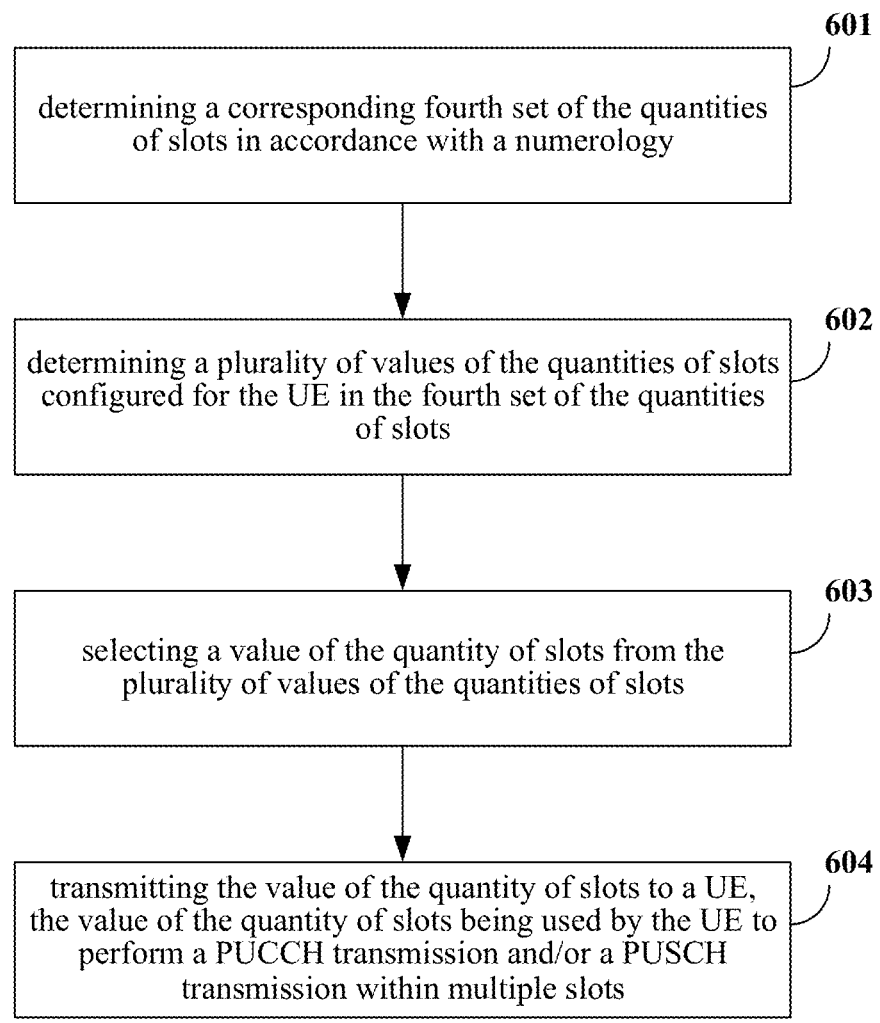
FIG. 6 is still yet another flow chart of the multi-slot transmission method according to an embodiment of the present disclosure.

The present disclosure further provides in some embodiments a multi-slot transmission method implemented by a network-side device which, as shown in FIG. 6, includes the following steps.

Step 601: determining a corresponding fourth set of the quantities of slots in accordance with a numerology.

In a possible embodiment of the present disclosure, the fourth set of the quantities of slots may be a predefined set of the quantities of slots with respect to each numerology.

Step 602: determining a plurality of values of the quantities of slots configured for the UE in the fourth set of the quantities of slots.

Step 603: selecting a value of the quantity of slots from the plurality of values of the quantities of slots.

Step 604: configuring the value of the quantity of slots to a UE, the value of the quantity of slots being used by the UE to perform a PUCCH transmission and/or a PUSCH transmission within multiple slots.

In a possible embodiment of the present disclosure, the plurality of values of the quantities of slots may be configured for the UE through high-layer signaling.

In a possible embodiment of the present disclosure, the value of the quantity of slots may be configured to the UE through, but not limited to, high-layer signaling or DCI.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 7:
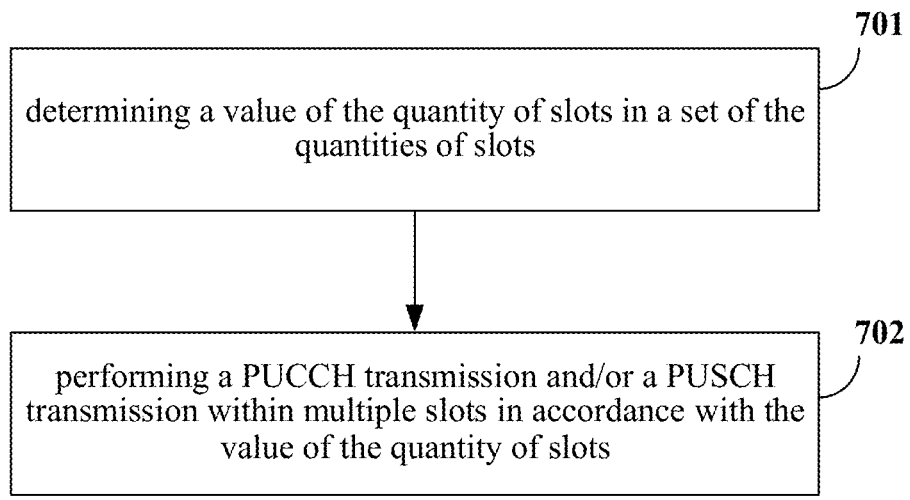
FIG. 7 is still yet another flow chart of a multi-slot transmission method according to an embodiment of the present disclosure.

The present disclosure further provides in some embodiments a multi-slot transmission method implemented by a UE which, as shown in FIG. 7, includes the following steps.

Step 701: determining a value of the quantity of slots in a set of the quantities of slots.

In a possible embodiment of the present disclosure, the set of the quantities of slots may be a predefined set of the quantities of slots without respect to the numerology, or with respect to each numerology.

In a possible embodiment of the present disclosure, configuration information for determining the value of the quantity of slots may be received from a network-side device through high-layer signaling or DCI.

Step 702: performing a PUCCH transmission and/or a PUSCH transmission within multiple slots in accordance with the value of the quantity of slots.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 8:
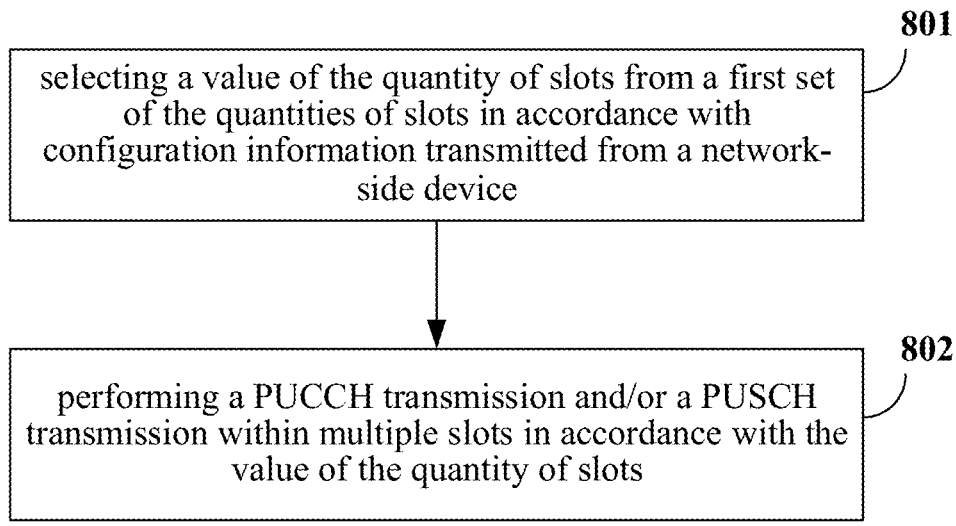
FIG. 8 is still yet another chart of the multi-slot transmission method according to an embodiment of the present disclosure.

The present disclosure further provides in some embodiments a multi-slot transmission method implemented by a UE which, as shown in FIG. 8, includes the following steps.

Step 801: selecting a value of the quantity of slots from a first set of the quantities of slots in accordance with configuration information transmitted from a network-side device.

In a possible embodiment of the present disclosure, the first set of the quantities of slots may be a predefined set of the quantities of slots.

Step 802: performing a PUCCH transmission and/or a PUSCH transmission within multiple slots in accordance with the value of the quantity of slots.

In a possible embodiment of the present disclosure, the configuration information for determining the value of the quantity of slots may be received from the network-side device through high-layer signaling or DCI.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 9:
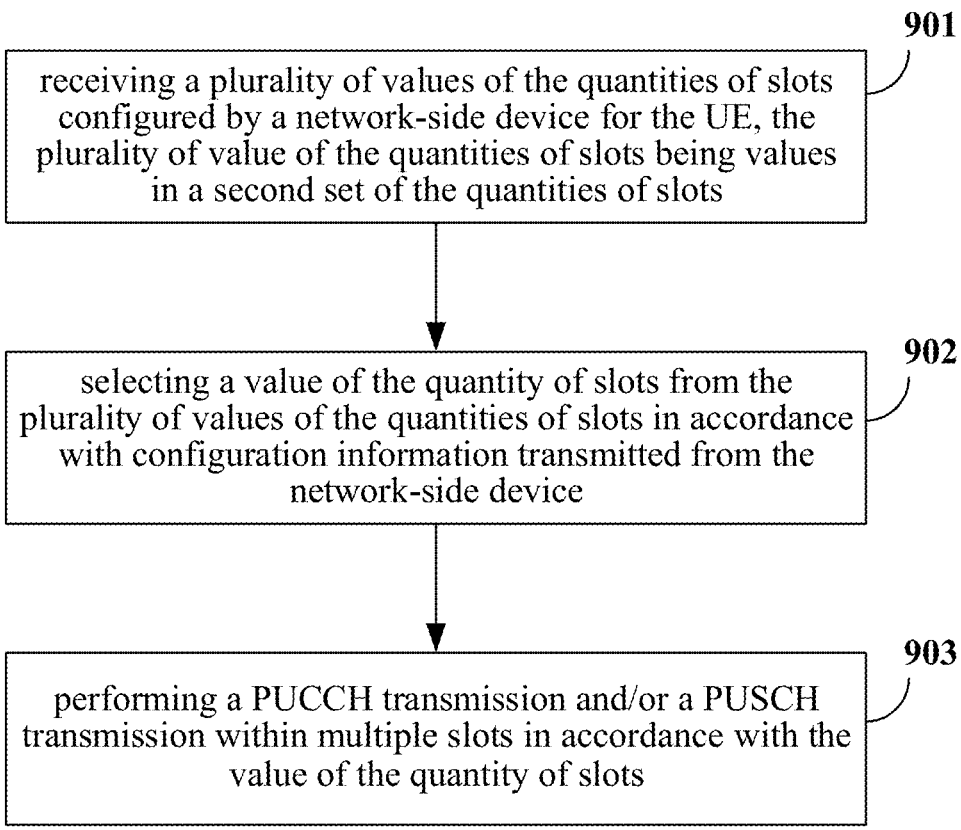
FIG. 9 is still yet another of the multi-slot transmission method according to an embodiment of the present disclosure.

The present disclosure further provides in some embodiments a multi-slot transmission method implemented by a UE which, as shown in FIG. 9, includes the following steps.

Step 901: receiving a plurality of values of the quantities of slots configured by a network-side device for the UE, the plurality of values of the quantities of slots being values in a second set of the quantities of slots.

In a possible embodiment of the present disclosure, the second set of the quantities of slots may be a predefined set of the quantities of slots.

In a possible embodiment of the present disclosure, the plurality of values of the quantities of slots configured by the network-side device for the UE may be received through the high-layer signaling.

Step 902: selecting a value of the quantity of slots from the plurality of values of the quantities of slots in accordance with configuration information transmitted from the network-side device.

Step 903: performing a PUCCH transmission and/or a PUSCH transmission within multiple slots in accordance with the value of the quantity of slots.

In a possible embodiment of the present disclosure, the configuration information for determining the value of the quantity of slots may be received from the network-side device through high-layer signaling or DCI.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 10:
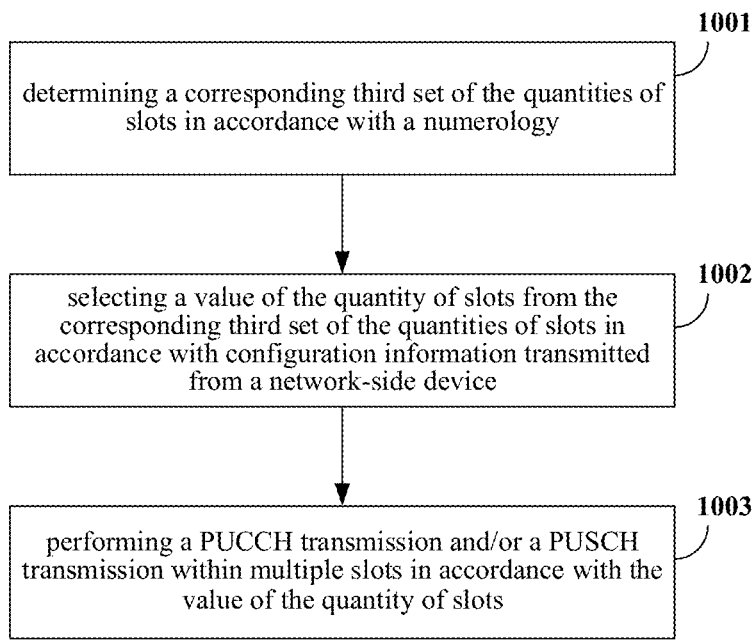
FIG. 10 is still yet another flow chart of the multi-slot transmission method according to an embodiment of the present disclosure.

The present disclosure further provides in some embodiments a multi-slot transmission method implemented by a UE which, as shown in FIG. 10, includes the following steps.

Step 1001: determining a corresponding third set of the quantities of slots in accordance with a numerology.

In a possible embodiment of the present disclosure, the third set of the quantities of slots may be a predefined set of the quantities of slots with respect to each numerology.

Step 1002: selecting a value of the quantity of slots from the corresponding third set of the quantities of slots in accordance with configuration information transmitted from a network-side device.

Step 1003: performing a PUCCH transmission and/or a PUSCH transmission within multiple slots in accordance with the value of the quantity of slots.

In a possible embodiment of the present disclosure, the configuration information for determining the value of the quantity of slots may be received from the network-side device through high-layer signaling or DCI.

According to the embodiments of the present disclosure, the UE may determine the value of the quantity of slots from the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

Figure 11:
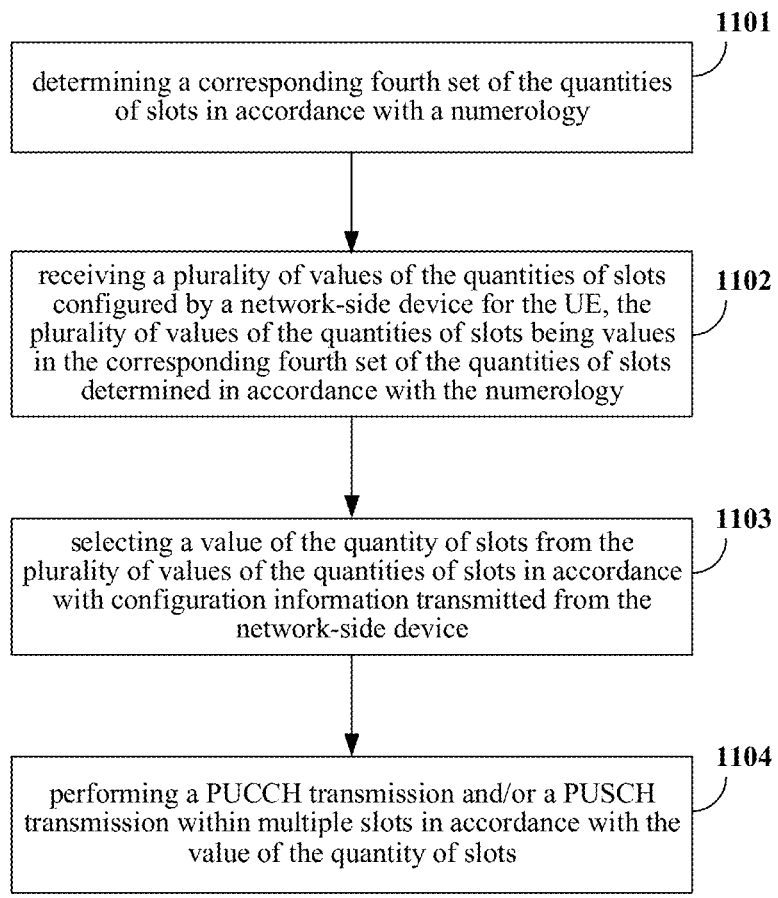
FIG. 11 is still yet another flow chart of the multi-slot transmission method according to an embodiment of the present disclosure.

The present disclosure further provides in some embodiments a multi-slot transmission method implemented by a UE which, as shown in FIG. 11, includes the following steps.

Step 1101: determining a corresponding fourth set of the quantities of slots in accordance with a numerology.

In a possible embodiment of the present disclosure, the fourth set of the quantities of slots may be a predefined set of the quantities of slots with respect to each numerology.

Step 1102: receiving a plurality of values of the quantities of slots configured by a network-side device for the UE, the plurality of values of the quantities of slots being values in the corresponding fourth set of the quantities of slots determined in accordance with the numerology.

In a possible embodiment of the present disclosure, the plurality of values of the quantities of slots configured by the network-side device for the UE may be received through high-layer signaling.

Step 1103: selecting a value of the quantity of slots from the plurality of values of the quantities of slots in accordance with configuration information transmitted from the network-side device.

Step 1104: performing a PUCCH transmission and/or a PUSCH transmission within multiple slots in accordance with the value of the quantity of slots.

In a possible embodiment of the present disclosure, configuration information for determining the value of the quantity of slots may be received from the network-side device through high-layer signaling or DCI.

According to the embodiments of the present disclosure, the UE may determine the value of the quantity of slots in the preconfigured set of the quantities of slots in accordance with the configuration of the network-side device. As a result, it is able to perform the PUCCH transmission and/or the PUSCH transmission within multiple slots, thereby to improve the performance as well as the uplink coverage of the PUCCH transmission and/or the PUSCH transmission.

EXAMPLE 1

A1 values of the quantities of slots may be predefined (without respect to the numerology), and a value of the quantity of slots may be selected from the A1 values of the quantities of slots and notified to the UE.

For example, a plurality of values [1~32] of the quantities of slots gradually increasing at a step of P may be predefined in a protocol, where P is a natural number, or 1, or a multiple of 2, or a power of 2.

For example, 32 values of the quantities of slots gradually increasing at a step of 1, or 16 values of the quantities of slots gradually increasing at a step of 2, or 8 values of the quantities of slots gradually increasing at a step of 4, or the like may be predefined with respect to the [1~32]in a protocol, or [1,2,4,8,16,32] may be predefined with respect to the [1~32] in a protocol, and then one value of the quantity of slots may be selected and notified to the UE.

EXAMPLE 2

A2 values of the quantities of slots may be predefined (without respect to the numerology), and B1 values of the quantities of slots may be selected from the A1 values and configured, through high-layer signaling, for the UE in advance. Then, one value of the quantity of slots may be selected from the B1 values and notified to the UE.

For example, a plurality of values [1~32] of the quantities of slots gradually increasing at a step of P may be predefined in a protocol, where P is a natural number, or 1, or a multiple of 2, or a power of 2.

For example, 32 values of the quantities of slots gradually increasing at a step of 1, or 16 values of the quantities of slots gradually increasing at a step of 2, or 8 values of the quantities of slots gradually increasing at a step of 4, or the like may be predefined with respect to the [1~32] in a protocol, or [1,2,4,8,16,32] may be predefined with respect to the [1~32] in a protocol.

The B1 values of the quantities of slots selected from the predefined set of the quantities of slots may be notified to the UE through high-layer signaling (e.g., B1=3 or 4), and then it may be notified to the UE through an indication field having $\lceil \log_2 {}_B 1 \rceil$ bits (e.g., 2 bits) in the DCI. The indication field may be used to indicate one value of the quantity of the slots in the B1 values configured in advance for the UE through the high-layer signaling.

EXAMPLE 3

A3 values of the quantities of slots may be predefined with respect to each numerology, and the A3 values of the quantities of slots may be the same or different for different numerologies. A corresponding set of the quantities of slots may be determined in accordance with the numerology, and one value of the quantity of slots may be selected from the determined set of the quantities of slots and notified to the UE.

For example, the sets of the quantities of slots with respect to each numerology may be predefined in a protocol, as shown in Table 1, where μ represents a serial number of a respective numerology, and a second column represents a subcarrier spacing Δf corresponding to a respective numerology. The UE and a base station may determine in advance the corresponding set of the quantities of slots in accordance with the numerology being used, and then one value of the quantity of slots may be indicated to the UE through high-layer signaling or an indication field in the DCI.

TABLE 1

| μ | $\Delta f = 2^\mu \cdot 15$ [kHz] | set of the number of slots |
|---|---|---|
| 0 | 15 | [1, reserved, reserved, reserved] |
| 1 | 30 | [1, 2, reserved, reserved] |
| 2 | 60 | [1, 2, 3, 4] |
| 3 | 120 | [1, 2, 4, 8] |

TABLE 1-continued

| μ | Δf = $2^\mu \cdot 15$ [kHz] | set of the number of slots |
|---|---|---|
| 4 | 240 | [1, 4, 8, 16] |
| 5 | 480 | [1, 8, 16, 32] |

EXAMPLE 4

A4 values of the quantities of slots may be predefined with respect to each numerology, and the A4 values of the quantities of slots may be the same or different for different numerologies. A universal set of the corresponding quantities of slots may be determined in accordance with the numerology, and B2 values of the quantities of slots may be selected from the determined universal set and configured for the UE through high-layer signaling, and then one value of the quantity of slots may be selected from the B2 values and notified to the UE.

For example, the sets of the quantities of slots with respect to each numerology may be predefined in a protocol, as shown in Table 2, where μ represents serial numbers of a respective numerology, a second column represents a subcarrier spacing Δf corresponding to a respective numerology, and P is a natural number, or 1, or a multiple of 2, or a power of 2. The UE and the base station may determine in advance the corresponding universal set of the quantities of slots in accordance with the numerology being used, and then B2 values of the quantities of slots may be selected by the bae station from the universal set (e.g., B2=3 or 4) and configured for the UE through high-layer signaling. Then, one value of the quantity of slots may be selected from the set of the quantities of slots notified to the UE, and the value of the quantity of slots is indicated to the UE through the indication field in the DCI.

TABLE 2

| μ | Δf = $2^\mu \cdot 15$ [kHz] | set of the number of slots |
|---|---|---|
| 0 | 15 | [1, reserved, reserved, reserved] |
| 1 | 30 | [1, 2, reserved, reserved] |
| 2 | 60 | [1, 2, 3, 4] |
| 3 | 120 | a plurality of values of the quantities of slots increasing gradually at a step of P with respect to [1~8] |
| 4 | 240 | a plurality of values of the quantities of slots increasing gradually at a step of P with respect to [1~16] |
| 5 | 480 | a plurality of values of the quantities of slots increasing gradually at a step of P with respect to [1~32] |

The present disclosure further provides in some embodiments a network-side device. A principle of the network-side device for solving the problems may be similar to that of the multi-slot transmission method, so the implementation of the network-side device may refer to that of the multi-slot transmission method and thus will not be particularly defined herein.

Figure 12:
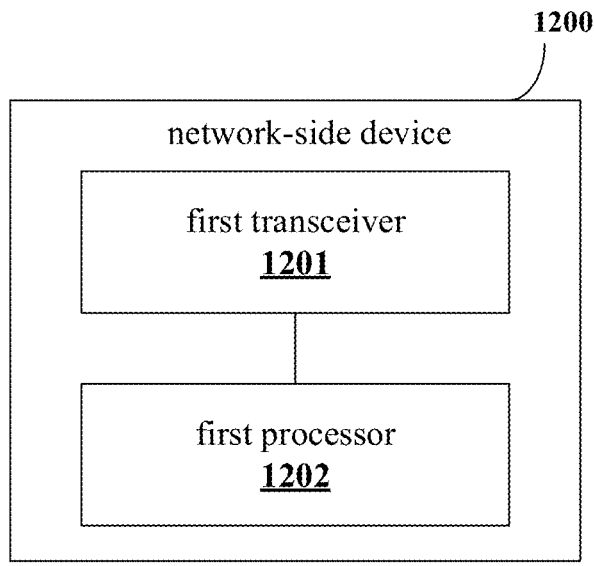
FIG. 12 is a schematic view showing a network-side device according to an embodiment of the present disclosure.

The present disclosure provides in some embodiments a network-side device 1200 which, as shown in FIG. 12, includes a first transceiver 1201 and a first processor 1202. The first processor 1202 is configured to determine a value of the quantity of slots in a set of the quantities of slots. The first transceiver 1201 is configured to configure the value of the quantity of slots to a UE, and the value of the quantity of slots may be used by the UE to perform a PUCCH transmission and/or a PUSCH transmission within multiple slots.

In a possible embodiment of the present disclosure, the set of the quantities of slots may be a predefined first set of the quantities of slots. The first processor 1202 is further configured to select the value of the quantity of slots from the first set of the quantities of slots.

In a possible embodiment of the present disclosure, the set of the quantities of slots may be a predefined second set of the quantities of slots. The first processor 1202 is further configured to: determine a plurality of values of the quantities of slots configured for the UE in the second set of the quantities of slots; and select the value of the quantity of slots from the plurality of values of the quantities of slots.

In a possible embodiment of the present disclosure, the first processor 1202 is further configured to configure the plurality of values of the quantities of slots for the UE through high-layer signaling.

In a possible embodiment of the present disclosure, the set of the quantities of slots may be a predefined third set of the quantities of slots with respect to each numerology. The first processor 1202 is further configured to: determine the corresponding third set of the quantities of slots in accordance with the numerology; and select the value of the quantity of slots from the corresponding third set of the quantities of slots.

In a possible embodiment of the present disclosure, the set of the quantities of slots may be a predefined fourth set of the quantities of slots with respect to each numerology. The first processor 1202 is further configured to: determine the corresponding fourth set of the quantities of slots in accordance with the numerology; determine a plurality of values of the quantities of slots configured for the UE in the fourth set of the quantities of slots; and select the value of the quantity of slots from the plurality of values of the quantities of slots.

In a possible embodiment of the present disclosure, the first processor 1202 is further configured to configure the plurality of values of the quantities of slots for the UE through high-layer signaling.

In a possible embodiment of the present disclosure, the first transceiver 1201 is further configured to configure the value of the quantity of slots to the UE through high-layer signaling or DCI.

The network-side device in the embodiments of the present disclosure is capable of implementing the above-mentioned multi-slot transmission method with a similar principle and a similar technical effect, which will not be particularly defined herein.

The present disclosure further provides in some embodiments a UE. A principle of the UE for solving the problems may be similar to that of the multi-slot transmission method, so the implementation of the UE may refer to that of the multi-slot transmission method and thus will not be particularly defined herein.

Figure 13:
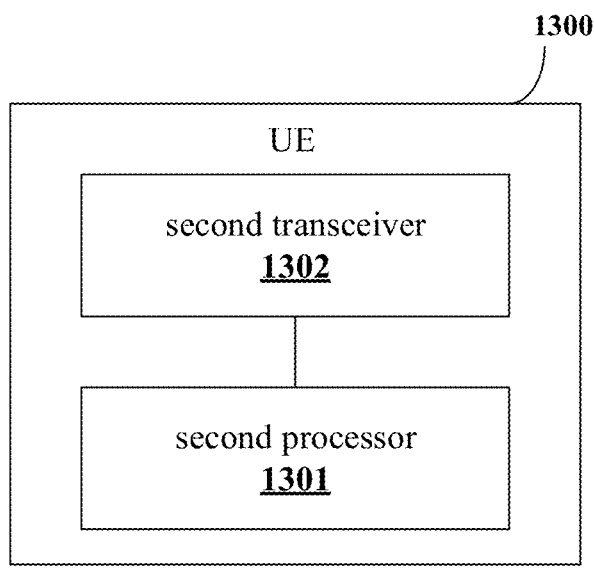
FIG. 13 is a schematic view showing a UE according to an embodiment of the present disclosure.

The present disclosure provides in some embodiments a UE 1300 which, as shown in FIG. 13, includes a second processor 1301 and a second transceiver 1302. The second processor 1301 is configured to determine a value of the quantity of slots in a set of the quantities of slots. The second transceiver 1302 is configured to perform a PUCCH transmission and/or a PUSCH transmission within multiple slots in accordance with the value of the quantity of slots.

In a possible embodiment of the present disclosure, the set of the quantities of slots may be a predefined first set of the quantities of slots. The second processor 1301 is further configured to select the value of the quantity of slots from the first set of the quantities of slots in accordance with configuration information transmitted from a network-side device.

In a possible embodiment of the present disclosure, the set of the quantities of slots may be a predefined second set of the quantities of slots. The second transceiver 1302 is further configured to receive a plurality of values of the quantities of slots configured by the network-side device for the UE, the plurality of values of the quantities of slots being values in the second set of the quantities of slots. The second processor 1301 is further configured to select the value of the quantity of slots from the plurality of values of the quantities of slots in accordance with the configuration information transmitted from the network-side device.

In a possible embodiment of the present disclosure, the second processor 1301 is further configured to receive the plurality of values of the quantities of slots configured by the network-side device for the UE through high-layer signaling.

In a possible embodiment of the present disclosure, the set of the quantities of slots may be a predefined third set of the quantities of slots with respect to each numerology. The second processor 1301 is further configured to: determine the corresponding third set of the quantities of slots in accordance with the numerology; and select the value of the quantity of slots from the corresponding third set of the quantities of slots in accordance with the configuration information transmitted from the network-side device.

In a possible embodiment of the present disclosure, the set of the quantities of slots may be a predefined fourth set of the quantities of slots with respect to each numerology. The second processor 1301 is further configured to determine the corresponding fourth set of the quantities of slots in accordance with the numerology. The second transceiver 1302 is further configured to receive a plurality of values of the quantities of slots configured by the network-side device for the UE, the plurality of values of the quantities of slots being values in the fourth set of the quantities of slots determined in accordance with the numerology. The second processor 1301 is further configured to select the value of the quantity of slots from the plurality of values of the quantities of slots in accordance with the configuration information transmitted from the network-side device.

In a possible embodiment of the present disclosure, the second transceiver 1301 is further configured to receive the plurality of values of the quantities of slots configured by the network-side device for the UE through high-layer signaling.

In a possible embodiment of the present disclosure, the second transceiver 1302 is further configured to receive, through high-layer signaling or DCI, the configuration information for determining the value of the quantity of slots transmitted from the network-side device.

The UE in the embodiments of the present disclosure is capable of implementing the above-mentioned multi-slot transmission method with a similar principle and a similar technical effect, which will not be particularly defined herein.

Figure 14:
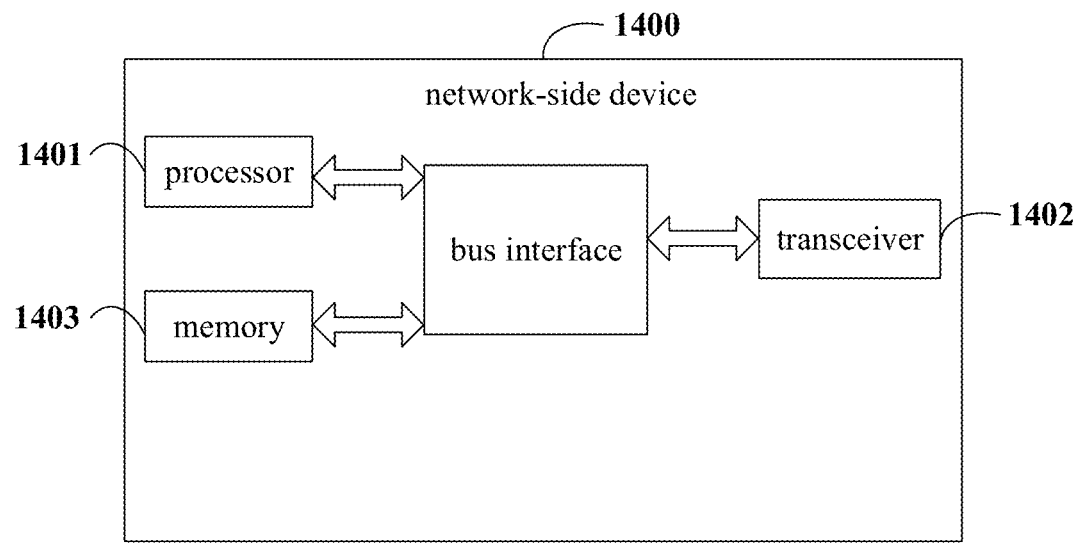
FIG. 14 is another schematic view showing the network-side device according to an embodiment of the present disclosure.

The present disclosure further provides in some embodiments a network-side device 1400 which, as shown in FIG. 14, includes a processor 1401, a transceiver 1402, a memory 1403 and a bus interface. The processor 1401 may take charge of managing the bus architecture as well as general processing. The memory 1403 may store therein data for the operation of the processor 1401.

In the embodiments of the present disclosure, the network-side device 1400 may further include a computer program stored in the memory 1403 and executed by the processor 1401. The processor 1401 is configured to execute the computer program so as to: determine a value of the quantity of slots in a set of the quantities of slots; and configure the value of the quantity of slots to a UE, the value of the quantity of slots being used by the UE to perform a PUCCH transmission and/or a PUSCH transmission within multiple slots.

In FIG. 14, bus architecture may include a number of buses and bridges connected to each other, so as to connect various circuits for one or more processors such as the processor 1401 and one or more memories such as the memory 1403. In addition, as is known in the art, the bus architecture may be used to connect any other circuits, such as a circuit for a peripheral device, a circuit for a voltage stabilizer and a power management circuit, which is known in the art and will not be particularly defined herein. The bus interface may be provided, and the transceiver 1402 may consist of a plurality of elements, i.e., a transmitter and a receiver for communication with any other devices over a transmission medium. The processor 1401 may take charge of managing the bus architecture as well as general processing. The memory 1403 may store therein data for the operation of the processor 1401.

Figure 15:
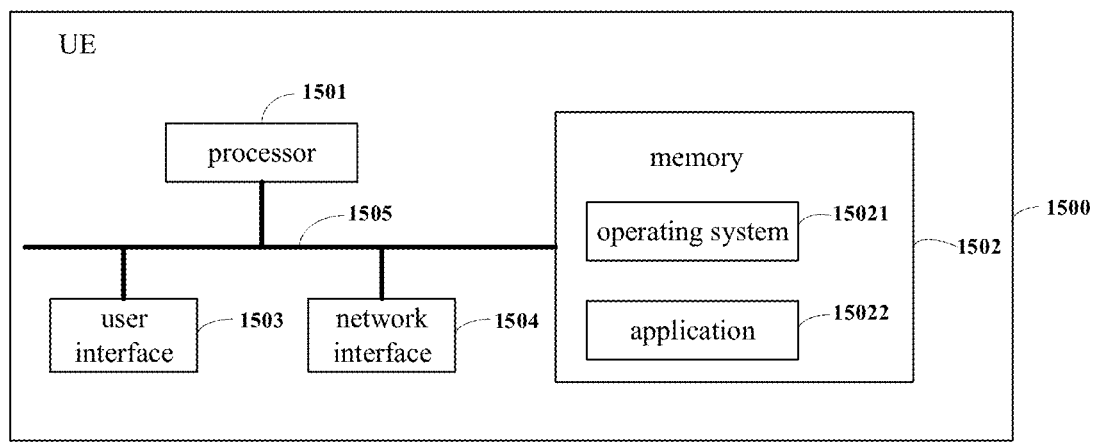
FIG. 15 is another schematic view showing the UE according to an embodiment of the present disclosure.

The present disclosure further provides in some embodiments a UE 1500 which, as shown in FIG. 15, includes at least one processor 1501, a memory 1502, at least one network interface 1504, and a user interface 1503. The components of the UE 1500 may be coupled together through a bus system 1505. It should be appreciated that, the bus system 1505 is configured to achieve connection and communication among the components. Apart from a data bus, the bus system 1505 may further include a power source bus, a control bus and a state signal bus. For clarification, all these buses in FIG. 15 may be collectively called as the bus system 1505.

The user interface 1503 may include a display, a keyboard or a pointing device (e.g., mouse, track ball, touch plate or touch panel).

It should be appreciated that, the memory 1502 may be a volatile memory, a nonvolatile memory or both in the embodiments of the present disclosure. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may be any of various types of RAMs, including Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) any Direct Rambus RAM (DRRAM). The memory 1502 intends to include, but not limited to, the above-mentioned and any other appropriate memories.

In a possible embodiment of the present disclosure, the following elements may be stored in the memory 1502: an executable module or data structure, a subset or an extended set thereof, an operating system 15021 and an application 15022.

The operating system 15021 may include various system programs, e.g., a framework layer, a core layer and a driving layer, so as to implement various basic services and process hardware-based tasks. The application 15022 may include various applications, e.g., media player and browser, so as to implement various application services. The programs for implementing the above-mentioned method may be included in the application 15022.

In the embodiments of the present disclosure, through calling a program or instruction stored in the memory 1502, e.g., a program or instruction stored in the application 15022, the processor 1501 is configured to: determine a value of the quantity of slots in a set of the quantities of slots; and perform a PUCCH transmission and/or a PUSCH transmission within multiple slots in accordance with the value of the quantity of slots.

The present disclosure further provides in some embodiments a computer-readable storage medium storing therein a computer program. The computer program is executed by a processor so as to implement the above-mentioned method for transmitting the downlink control channel, or the above-mentioned method for receiving the downlink control channel.

The steps of the methods or algorithm described in conjunction with the contents mentioned hereinabove may be implemented through hardware, or implemented by a processor executing software instructions. The software instructions may consist of corresponding modules stored in an RAM, a flash memory, an ROM, an EPROM, an EEPROM, a register, a hard disk, a mobile hard disk, a read-only optic disk, or any other known storage medium. Illustratively, the storage medium may be coupled to the processor, so that the processor is capable of reading information from the storage medium and writing information into the storage medium. It should be appreciated that, the storage medium may be a component of the processor. The processor and the storage medium may be located in an Application Specific Integrated Circuit (ASIC). In addition, the ASIC may be located in an interface device of a core network. It should be appreciated that, the processor and the storage medium may be located in the interface device of the core network as discrete assemblies.

It should be appreciated that, the functions described in one or more embodiments of the present disclosure may be achieved through hardware, software, firmware or a combination thereof. When the functions are achieved through software, these functions may be stored in the computer-readable medium or transmitted as one or more instructions or codes on the computer-readable medium. The computer-readable medium may include a computer storage medium and a communication medium. The communication medium may include any medium capable of transmitting a computer program from one place to another place. The storage medium may include any available medium capable of being accessed by a general-purpose or dedicated computer.

The objects, the technical solutions and the beneficial effects of the present disclosure have been described hereinabove in details. It should be appreciated that, the above description may be for illustrative purposes only, but shall not be used to limit the scope of the present disclosure. Any modifications, equivalent substitutions or improvements made based on the present disclosure shall also fall within the scope of the present disclosure.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or block diagrams. These computer program instructions may be provided to a processor of a common computer, a dedicated computer, an embedded processor or any other programmable data processing device to create a machine, so that instructions executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art may make further modifications and improvements to the embodiment of the present disclosure without departing from the spirit and the scope of the present disclosure, and these modifications and improvements shall also fall within the scope of the present disclosure when these modifications and improvement belongs to the scope of technologies of the attached claims and their equivalent.

What is claimed is:

1. A multi-slot transmission method for a network-side device, comprising:
   determining a value of the quantity of slots in a set of the quantities of slots; and
   configuring the value of the quantity of slots to a User Equipment (UE), the value of the quantity of slots being used by the UE for performing a Physical Uplink Control Channel (PUCCH) transmission and/or a Physical Uplink Shared Channel (PUSCH) transmission within multiple slots.

2. The multi-slot transmission method according to claim 1, wherein
   the set of the quantities of slots is a predefined first set of the quantities of slots; and
   the determining the value of the quantity of slots in the set of the quantities of slots comprises: selecting the value of the quantity of slots from the first set of the quantities of slots; or
   the set of the quantities of slots is a predefined third set of the quantities of slots with respect to each numerology; and the determining the value of the quantity of slots in the set of the quantities of slots comprises: determining a corresponding third set of the quantities of slots in accordance with a numerology; and selecting the value of the quantity of slots from the corresponding third set of the quantities of slots.

3. The multi-slot transmission method according to claim 1, wherein the set of the quantities of slots is a predefined second set of the quantities of slots; and
the determining the value of the quantity of slots in the set of the quantities of slots comprises: determining a plurality of values of the quantities of slots configured for the UE in the second set of the quantities of slots; and selecting the value of the quantity of slots from the plurality of values of the quantities of slots; or the set of the quantities of slots is a predefined fourth set of the quantities of slots with respect to each numerology; and the determining the value of the quantity of slots in the set of the quantities of slots comprises: determining a corresponding fourth set of the quantities of slots in accordance with a numerology; determining a plurality of values of the quantities of slots configured for the UE in the fourth set of the quantities of slots; and selecting the value of the quantity of slots from the plurality of values of the quantities of slots.

4. The multi-slot transmission method according to claim 3, further comprising:
configuring the plurality of values of the quantities of slots for the UE through high-layer signaling.

5. The multi-slot transmission method according to claim 1, wherein
the configuring the value of the quantity of slots to the UE comprises: configuring the value of the quantity of slots to the UE through high-layer signaling or Downlink Control Information (DCI).

6. A multi-slot transmission method for a UE, comprising:
determining a value of the quantity of slots in a set of the quantities of slots; and
performing a PUCCH transmission and/or a PUSCH transmission within multiple slots in accordance with the value of the quantity of slots.

7. The multi-slot transmission method according to claim 6, wherein
the set of the quantities of slots is a predefined first set of the quantities of slots; and
the determining the value of the quantity of slots in the set of the quantities of slots comprises: selecting the value of the quantity of slots from the first set of the quantities of slots in accordance with configuration information transmitted from a network-side device; or
the set of the quantities of slots is a predefined third set of the quantities of slots with respect to each numerology; and the determining the value of the quantity of slots in the set of the quantities of slots comprises: determining a corresponding third set of the quantities of slots in accordance with a numerology; and selecting the value of the quantity of slots from the corresponding third set of the quantities of slots in accordance with the configuration information transmitted from the network-side device.

8. The multi-slot transmission method according to claim 6, wherein
the set of the quantities of slots is a predefined second set of the quantities of slots; and
the determining the value of the quantity of slots in the set of the quantities of slots comprises: receiving a plurality of values of the quantities of slots configured by the network-side device for the UE, the plurality of values of the quantities of slots being values in the second set of the quantities of slots; and selecting the value of the quantity of slots from the plurality of values of the quantities of slots in accordance with the configuration information transmitted from the network-side device; or the set of the quantities of slots is a predefined fourth set of the quantities of slots with respect to each numerology; and the determining the value of the quantity of slots in the set of the quantities of slots comprises: determining a corresponding fourth set of the quantities of slots in accordance with a numerology; receiving a plurality of values of the quantities of slots configured by the network-side device for the UE, the plurality of values of the quantities of slots being values in the corresponding fourth set of the quantities of slots determined in accordance with the numerology; and selecting the value of the quantity of slots from the plurality of values of the quantities of slots in accordance with the configuration information transmitted from the network-side device.

9. The multi-slot transmission method according to claim 8, further comprising:
receiving the plurality of values of the quantities of slots configured by the network-side device for the UE through high-layer signaling.

10. The multi-slot transmission method according to claim 7, further comprising:
receiving, through high-layer signaling or DCI, the configuration information for determining the value of the quantity of slots transmitted from the network-side device.

11. A UE, comprising a memory, a processor, a transceiver, and a computer program stored in the memory and capable of being executed by the processor, the processor is configured to execute the computer program to implement the multi-slot transmission method according to claim 6.

12. The UE according to claim 11, wherein
the set of the quantities of slots is a predefined first set of the quantities of slots; and the determining the value of the quantity of slots in the set of the quantities of slots comprises: selecting the value of the quantity of slots from the first set of the quantities of slots in accordance with configuration information transmitted from a network-side device; or
the set of the quantities of slots is a predefined third set of the quantities of slots with respect to each numerology; and the determining the value of the quantity of slots in the set of the quantities of slots comprises: determining a corresponding third set of the quantities of slots in accordance with a numerology; and selecting the value of the quantity of slots from the corresponding third set of the quantities of slots in accordance with the configuration information transmitted from the network-side device.

13. The UE according to claim 11, wherein
the set of the quantities of slots is a predefined second set of the quantities of slots; and the determining the value of the quantity of slots in the set of the quantities of slots comprises: receiving a plurality of values of the quantities of slots configured by the network-side device for the UE, the plurality of values of the quantities of slots being values in the second set of the quantities of slots; and selecting the value of the quantity of slots from the plurality of values of the quantities of slots in accordance with the configuration information transmitted from the network-side device; or
the set of the quantities of slots is a predefined fourth set of the quantities of slots with respect to each numerology; and the determining the value of the quantity of slots in the set of the quantities of slots comprises: determining a corresponding fourth set of the quantities of slots in accordance with a numerology; receiving a plurality of values of the quantities of slots configured by the network-side device for the UE, the plurality of values of the quantities of slots being values in the corresponding fourth set of the quantities of slots determined in accordance with the numerology; and selecting the value of the quantity of slots from the plurality of values of the quantities of slots in accordance with the configuration information transmitted from the network-side device.

14. The UE according to claim 13, wherein the processor is further configured to execute the computer program to:
receive the plurality of values of the quantities of slots configured by the network-side device for the UE through high-layer signaling.

15. The UE according to claim 12, wherein the processor is further configured to execute the computer program to:
receive, through high-layer signaling or DCI, the configuration information for determining the value of the quantity of slots transmitted from the network-side device.

16. A network-side device, comprising a memory, a processor, a transceiver, and a computer program stored in the memory and capable of being executed by the processor, wherein the processor is configured to execute the computer program to:
determine a value of the quantity of slots in a set of the quantities of slots; and
configure the value of the quantity of slots to a UE, the value of the quantity of slots being used by the UE for performing a PUCCH transmission and/or a PUSCH transmission within multiple slots.

17. The network-side device according to claim 16, wherein
the set of the quantities of slots is a predefined first set of the quantities of slots; and the determining the value of the quantity of slots in the set of the quantities of slots comprises: selecting the value of the quantity of slots from the first set of the quantities of slots; or
the set of the quantities of slots is a predefined third set of the quantities of slots with respect to each numerology; and the determining the value of the quantity of slots in the set of the quantities of slots comprises: determining a corresponding third set of the quantities of slots in accordance with a numerology; and selecting the value of the quantity of slots from the corresponding third set of the quantities of slots.

18. The network-side device according to claim 16, wherein
the set of the quantities of slots is a predefined second set of the quantities of slots; and the determining the value of the quantity of slots in the set of the quantities of slots comprises: determining a plurality of values of the quantities of slots configured for the UE in the second set of the quantities of slots; and selecting the value of the quantity of slots from the plurality of values of the quantities of slots; or
the set of the quantities of slots is a predefined fourth set of the quantities of slots with respect to each numerology; and the determining the value of the quantity of slots in the set of the quantities of slots comprises: determining a corresponding fourth set of the quantities of slots in accordance with a numerology; determining a plurality of values of the quantities of slots configured for the UE in the fourth set of the quantities of slots; and selecting the value of the quantity of slots from the plurality of values of the quantities of slots.

19. The network-side device according to claim 18, wherein the processor is further configured to execute the computer program to:
configure the plurality of values of the quantities of slots for the UE through high-layer signaling.

20. The network-side device according to claim 16, wherein the processor is further configured to execute the computer program to:
configure the value of the quantity of slots to the UE through high-layer signaling or DCI.

* * * * *